No. 851,496. PATENTED APR. 23, 1907.
W. CHURCHILL.
LAMP.
APPLICATION FILED AUG. 6, 1906.
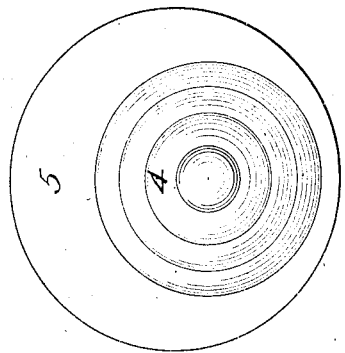
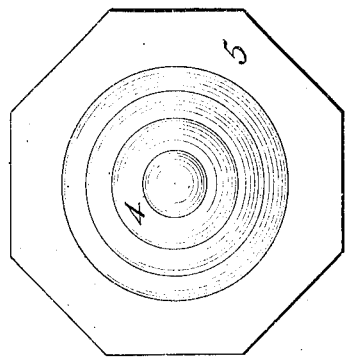
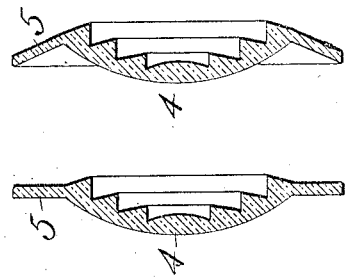
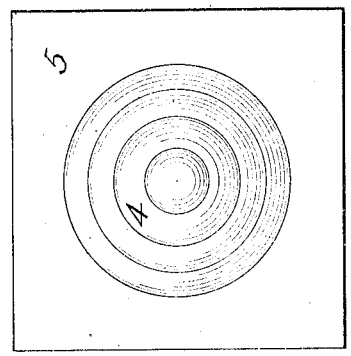
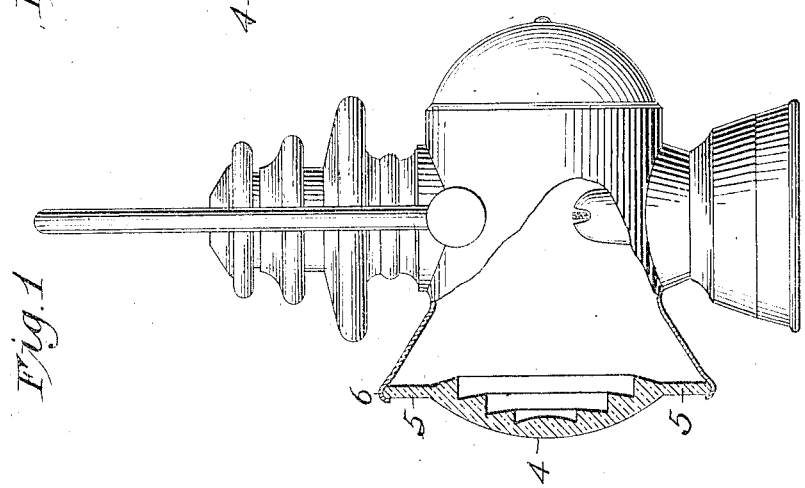

UNITED STATES PATENT OFFICE.

WILLIAM CHURCHILL, OF CORNING, NEW YORK, ASSIGNOR TO CORNING GLASS WORKS, OF CORNING, NEW YORK.

LAMP.

No. 851,496.   Specification of Letters Patent.   Patented April 23, 1907.

Application filed August 6, 1906. Serial No. 329,398.

*To all whom it may concern:*

Be it known that I, WILLIAM CHURCHILL, a citizen of the United States, residing at Corning, in the county of Steuben and State of New York, have invented new and useful Improvements in Lamps, of which the following is a specification.

This invention is more particularly applicable to automobile lamps although it may be employed with other types, as those for railroad, marine and general purposes using kerosene, acetylene gas, electricity, or other means of illumination.

In the accompanying drawings, Figure 1 is a view partly in section of an oil lamp of conventional type with which my invention is incorporated. Figs. 2 and 3 show cross sectional views of the lens detached. Figs. 4, 5 and 6 show front views of modifications in the shape of the lens.

Heretofore, especially in lamps for automobiles, it has been customary where a lens or bull's eye is employed to mount it in a tube, support or reflector of diameter greater than that of the lens, using for this purpose inwardly-extending struts or wires to which the annulus encircling the lens is secured, and to use in addition a plain glass set in the rim or outer portion of said tube, support or reflector. The object of such old construction is to permit the ready observation of the light or flame, to produce a wide area of illumination, and to allow the lamp when removed to cast some white light at a wide angle on the front of the car mechanism, etc.

These and other objects I attain by providing as one article or integral structure a lens having a refracting portion and a plain outer portion or flange, the latter constituting a window as hereinafter described. I prefer to employ as the central portion the type of lens shown in my Patent No. 801,766, dated Oct. 10, 1905.

The refracting portion of my structure is shown by 4 and the plain portion exterior to the outer zone by 5. In Figs. 1, and 2 the plain circular portion 5 is shown in a straight line taken on a diametrical section through the lens, while in Fig. 3 the part 5 is placed at a forwardly-projecting angle. In each case the edge of the plain portion 5 fits the supporting annulus 6 of the forwardly enlarging reflector and by each form equivalent results are produced; that is to say, the full effect of the bull's eye, signal glass or semaphore lens is secured, while the exterior plain portion 5 admits of the ready observation of the flame, and enables some light to be cast at a wide angle forward of the lamp, and when the lamp is removed allows sufficient light to permit inspection of any part of the machine.

That portion of the body of the lamp in which the lens is mounted constituting a reflector, a portion of the light from the flame is directly projected through the flange or window 5 in parallel beams, this reflector being used in connection with the reflector or reflecting surface, if used, in the rear of the lamp. In the use of the lens herein shown the plain and straight window or pane is wholly forward of the rear line or plane of the refracting portion, and the focal length of said refracting portion is materially reduced and thereby a divergence of the rays passing through it considerably increased. Thus a wider field of illumination at any given distance is secured than is possible with previous constructions known to me, and at the same time the refracting portion is brought near to the body of the lamp which, from the lamp maker's point of view, is an advantage.

I am aware that heretofore a lens has been used comprising a central refracting portion with an exterior plain portion having the same curvature as that of the refracting portion; and also that heretofore a lens has been devised having a flat plain surrounding portion flush with the plain back of the refracting part. But I am not aware that in any lamp prior to my invention has been used a lens having a central concavo-convex refracting portion and a surrounding plain and straight part which, as seen in diametrical section of the lens, is forward of the rear line or plane of said refracting portion.

I am also aware that a semaphore lens has been heretofore constructed with a short or narrow flat or other exterior flange adapted to fit a supporting ring; but such a lens differs from my invention in which is employed the broad exterior plain and straight surface or flange 5 fitted to the supporting reflecting ring, permitting the ready examination of the flame, and allowing a portion of the light to pass out through the plain straight surface at a wide angle, thereby greatly increasing the illuminating area. This is highly useful in cases where the lamp is removed from its support at night for the purpose of examining any part of the body or mechanism of an automobile or other vehicle or structure to which it may be applied; and when used with a vehicle is also important in illuminating a wide area of the road traveled. Furthermore, the flame may be seen through the broad plain and straight portion or flange 5 without distortion and its exact condition observed. The improved lens herein shown combined in a lamp is therefore to be differentiated from a lens provided with a flange simply as a means of attachment to a lamp or lantern frame, and which flange is concealed by said frame.

My invention is susceptible of various modifications. Thus instead, as shown in Figs. 1 and 2, of arranging the window 5 concentrically with the refracting portion it may be eccentric thereto as shown in Fig. 4. The window also instead of being circular may be square or of other polygonal shape as shown in Figs. 5 and 6.

My invention is adapted to lamps of the larger or smaller sizes for all purposes, and I do not restrict myself to any form of lamp or lantern, as one of any suitable character may be combined with the lens described.

Having thus described my invention, I claim:—

1. Combined with a lamp or lantern a lens in which are embodied a concavo-convex refracting portion and an integral plain and straight flange or window exterior thereto, said flange or window being wholly forward of the rear line or plane of said refracting portion, substantially as set forth.

2. Combined with a lamp or lantern a lens in which are embodied a concavo convex refracting portion and an intergal plain and straight flange or window exterior thereto, said flange or window being wholly forward of the rear line or plane of said refracting portion and parallel thereto, substantially as set forth.

In testimony whereof I affix my signature in presence of two witnesses.

WILLIAM CHURCHILL.

Witnesses:
R. H. CURTIS.
L. P. STRAIT.